United States Patent
Wang et al.

(10) Patent No.: US 10,831,237 B2
(45) Date of Patent: Nov. 10, 2020

(54) DUAL-SCREEN ELECTRONIC APPARATUS AND DISPLAY CONTROL METHOD THEREOF

(71) Applicant: Lenovo (Beijing) Co., Ltd., Beijing (CN)

(72) Inventors: Lijun Wang, Beijing (CN); Xinli Yu, Beijing (CN); Yimin Zheng, Beijing (CN); Yue Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/241,916

(22) Filed: Jan. 7, 2019

(65) Prior Publication Data
US 2019/0212779 A1 Jul. 11, 2019

(30) Foreign Application Priority Data
Jan. 5, 2018 (CN) .......................... 2018 1 0012537

(51) Int. Cl.
*G06F 1/16* (2006.01)
*G06F 3/14* (2006.01)
*G02F 1/1333* (2006.01)

(52) U.S. Cl.
CPC .......... *G06F 1/1647* (2013.01); *G06F 3/1423* (2013.01); *G02F 1/133308* (2013.01); *G09G 2380/02* (2013.01)

(58) Field of Classification Search
CPC ................. G06F 1/1647; G06F 3/1423; G02F 1/133308; G09G 2380/02
See application file for complete search history.

(56) References Cited

U.S. PATENT DOCUMENTS

| | | | | |
|---|---|---|---|---|
| 8,599,106 B2* | 12/2013 | Gimpl | ................... | G06F 1/1616 345/1.3 |
| 9,614,022 B2* | 4/2017 | Miyake | ............... | H01L 51/0097 |
| 9,857,849 B1* | 1/2018 | Siddiqui | ............... | G06F 1/1616 |
| 10,237,394 B2* | 3/2019 | Sirpal | ................... | G06F 1/1616 |
| 2006/0082518 A1* | 4/2006 | Ram | ..................... | G06F 1/1601 345/1.1 |
| 2007/0279315 A1* | 12/2007 | Laves | ................... | G06F 1/1615 345/1.1 |

(Continued)

FOREIGN PATENT DOCUMENTS

CN 102455739 A 5/2012
CN 102496356 A 6/2012
(Continued)

*Primary Examiner* — Dmitriy Bolotin
(74) *Attorney, Agent, or Firm* — Anova Law Group, PLLC (57) ABSTRACT

A dual-screen electronic apparatus is provided. The apparatus includes: a first display screen with a first physical border; a second display screen with a second physical border; and a processor, configured to control display of the first display screen and the second display screen. In response to a first mode of use, a first portion of the second physical border and a second portion of the first physical border are hidden from view; and in response to a second mode of use, the first display screen is arranged on a first surface of the dual-screen electronic apparatus, and the second display screen is arranged on a second surface of the dual-screen electronic apparatus, the first surface being opposite to the second surface.

20 Claims, 7 Drawing Sheets

(56) References Cited

U.S. PATENT DOCUMENTS

| | | | |
|---|---|---|---|
| 2010/0085274 A1* | 4/2010 | Kilpatrick, II | G06F 1/1616 345/1.3 |
| 2010/0298032 A1* | 11/2010 | Lee | G06F 1/1616 455/566 |
| 2011/0018821 A1* | 1/2011 | Kii | G06F 1/1616 345/173 |
| 2011/0072344 A1* | 3/2011 | Harris | G06F 3/04817 715/702 |
| 2011/0074717 A1* | 3/2011 | Yamashita | G06F 1/1654 345/173 |
| 2011/0157057 A1* | 6/2011 | Hata | G06F 1/1681 345/173 |
| 2011/0187662 A1* | 8/2011 | Lee | G06F 1/1641 345/173 |
| 2012/0084714 A1* | 4/2012 | Sirpal | G06F 1/1616 715/790 |
| 2012/0113614 A1* | 5/2012 | Watanabe | G02F 1/13336 361/810 |
| 2012/0214552 A1* | 8/2012 | Sirpal | G06F 1/1616 455/566 |
| 2012/0218202 A1* | 8/2012 | Sirpal | G06F 1/1616 345/173 |
| 2012/0218302 A1* | 8/2012 | Sirpal | G06F 1/1616 345/649 |
| 2012/0225693 A1* | 9/2012 | Sirpal | G06F 1/1616 455/566 |
| 2012/0225694 A1* | 9/2012 | Sirpal | G06F 1/1616 455/566 |
| 2012/0249445 A1 | 10/2012 | Suzuki et al. | |
| 2012/0280924 A1* | 11/2012 | Kummer | H04M 1/0235 345/173 |
| 2013/0002568 A1* | 1/2013 | Selim | G06F 1/1616 345/173 |
| 2015/0243202 A1 | 8/2015 | Lombardi et al. | |
| 2015/0255023 A1* | 9/2015 | Lee | G09G 3/36 345/204 |
| 2017/0357294 A1* | 12/2017 | Siddiqui | G06F 1/1616 |

FOREIGN PATENT DOCUMENTS

| | | |
|---|---|---|
| CN | 105374291 A | 3/2016 |
| CN | 106293580 A | 1/2017 |
| CN | 106774671 A | 5/2017 |

\* cited by examiner

DUAL-SCREEN ELECTRONIC APPARATUS AND DISPLAY CONTROL METHOD THEREOF

CROSS-REFERENCE TO RELATED APPLICATION

This application claims the priority to Chinese Patent Application No. 201810012537.8, entitled "DUAL-SCREEN ELECTRONIC APPARATUS AND DISPLAY CONTROL METHOD THEREOF," filed on Jan. 5, 2018, the entire content of which is incorporated herein by reference.

TECHNICAL FIELD

The present disclosure relates to the field of electronic technologies, and in particular, to a dual-screen electronic apparatus and a display control method thereof.

BACKGROUND

Demands for electronic devices with dual-screen displays have been increasing with technological development in electronic technologies. In a typical dual-screen display, two independent display screens are connected to form a combined display screen on a flat surface. This configuration may pose high technical requirements for the display screens. For example, flexible display screens may be needed, which increases the cost and complexity of the system.

It has been a technical challenge to combine two rigid display screens to form a combined display screen with extended display area and portable size with a borderless connection between the two display screens.

SUMMARY

The present disclosure provides a dual-screen electronic apparatus based on rigid display screens and a display control method thereof.

According to an aspect of the present disclosure, a dual-screen electronic apparatus is provided. The apparatus includes: a first display screen with a first physical border; a second display screen with a second physical border; and a processor, configured to control display of the first display screen and the second display screen. In response to a first mode of use, a first portion of the second physical border and a second portion of the first physical border are hidden from view; and in response to a second mode of use, the first display screen is arranged on a first surface of the dual-screen electronic apparatus, and the second display screen is arranged on a second surface of the dual-screen electronic apparatus, the first surface being opposite to the second surface.

In certain embodiments, the dual-screen electronic apparatus further includes: a housing integrating the first display screen, the first physical border, the second display screen, the second physical border, and the processor into one physical unit. When the mode of use is the first mode of use, a first portion of the housing adjacent to the first physical border of the first display screen and a second portion of the housing adjacent to the second physical border the second display screen are hidden from view.

In certain embodiments, the first physical border is bent with a first curvature; the second physical border is bent with a second curvature; when an angle formed by the first display screen and the second display screen is greater than or equal to a threshold angle, the second portion of the first physical border and the first portion of the second physical border are hidden from view.

In certain embodiments, when the angle formed by the first display screen and the second display screen is greater than or equal to the threshold angle, the first portion and the second portion of the housing are hidden from view.

In certain embodiments, when the angle formed by the first display screen and the second display screen is 0: the first display screen is arranged on the first surface of the dual-screen electronic apparatus; the second display screen is arranged on the second surface of the dual-screen electronic apparatus; the first physical border is not exposed on the first surface; and the second physical border is not exposed on the second surface.

In certain embodiments, the dual-screen electronic apparatus further includes a first rotating shaft installed between a third portion of the first physical border and a third portion of the second physical border, and a second rotating shaft installed between a fourth portion of the first physical border and a fourth portion of the second physical border; and the processor is further configured to control the first rotating shaft and the second rotating shaft to set the dual-screen electronic apparatus in the first mode of use or the second mode of use.

In certain embodiments, when the dual-screen electronic apparatus is in the first mode of use, the processor is configured to control the first rotating shaft and the second rotating shaft to set the angle formed by the first display screen and the second display screen to an angle equal to or greater than a threshold angle.

In certain embodiments, when the dual-screen electronic apparatus is in the second mode of use, the processor is configured to control the first rotating shaft and the second rotating shaft to set the angle formed by the first display screen and the second display screen to 0.

In another aspect of the present disclosure, a dual-screen electronic apparatus is provided. The dual-screen electronic apparatus includes: a first display screen including a first curved display area and a first flat display area; a second display screen including a second curved display area and a second flat display area; and a processor, configured to: process first display information to be outputted by the first curved display area to display a first target object with visual consistency between the first curved display area and the first flat display area; and process second display information to be outputted by the second curved display area to display a second target object with visual consistency between the second curved display area and the second flat display area.

In certain embodiments, the processor is further configured to: control the first display screen and the second display screen to display the first target object and the second target object to form a continuously displayed image.

In certain embodiments, the first target object and the second target object are different parts of a same display object.

In certain embodiments, the first target object and the second target object are the same part of a same display object.

In another aspect of the present disclosure, a display control method for a dual-screen electronic apparatus is provided. The method includes: obtaining a usage mode of the dual-screen electronic apparatus; adjusting an angle formed by the first display screen and the second display screen according to the mode of use; determining a first curved display area and a first flat display area of the first display screen; determining a second curved display area and a second flat display area of the second display screen; processing first display information to be outputted by the first curved display area to display a first target object with visual consistency between the first curved display area and the first flat display area; and processing second display information to be outputted by the second curved display area to display a second target object with visual consistency between the second curved display area and the second flat display area.

In certain embodiments, the display control method further includes: controlling the first display screen and the second display screen to display the first target object and the second target object to form a continuously displayed image.

In certain embodiments, the first target object and the second target object are different parts of a same display object.

In certain embodiments, the first target object and the second target object are a same part of a same display object.

In certain embodiments, adjusting the angle formed by the first display screen and the second display screen according to the mode of use includes: controlling rotation movement of a first rotating shaft and a second rotating shaft installed between the first display screen and the second display screen.

In certain embodiments, adjusting the angle formed by the first display screen and the second display screen according to the mode of use further includes: in response to a first mode of use, controlling rotation movement of the first rotating shaft and the second rotating shaft to set the angle formed by the first display screen and the second display screen to an angle greater than or equal to a threshold angle.

In certain embodiments, adjusting the angle formed by the first display screen and the second display screen according to the mode of use further includes: in response to a second mode of use, controlling rotation movement of the first rotating shaft and the second rotating shaft to set the angle formed by the first display screen and the second display screen to 0.

The above aspects will be explained in detail with accompanying drawings.

BRIEF DESCRIPTION OF THE DRAWINGS

In order to more clearly illustrate the technical solutions provided by the present disclosure, the drawings used in the description of the embodiments will be briefly described below.

DETAILED DESCRIPTION OF THE EMBODIMENTS

Technical solutions of the present disclosure will be described with reference to the accompanying drawings. It should be noted that, in the present disclosure, relational terms such as first and second are used merely to distinguish one entity or operation from another entity or operation, and do not necessarily require or imply that there is any actual relationship or order between these entities or operations.

Unless otherwise indicated, the same numerical referrals in different drawings refer to the same or similar elements. When a first component is referred to as "fixed to", or "arranged on" a second component, it is intended that the first component may be directly attached to the second component or may be indirectly attached to the second component via another component. When a first component is referred to as "connecting" or "connected" to a second component, it is intended that the first component may be directly connected to the second component or may be indirectly connected to the second component via a third component between them. The terms "perpendicular," "horizontal," "left," "right," and similar expressions used herein may be merely intended for describing relative orientation and/or positions.

Implementations of the following exemplary embodiments described herein are not limiting. Instead, they are merely examples of devices and methods consistent with aspects of the present disclosure. Other embodiments derived by those with ordinary skills in the art according to the described embodiments without inventive efforts shall fall within the scope of the present disclosure.

Figure 1:
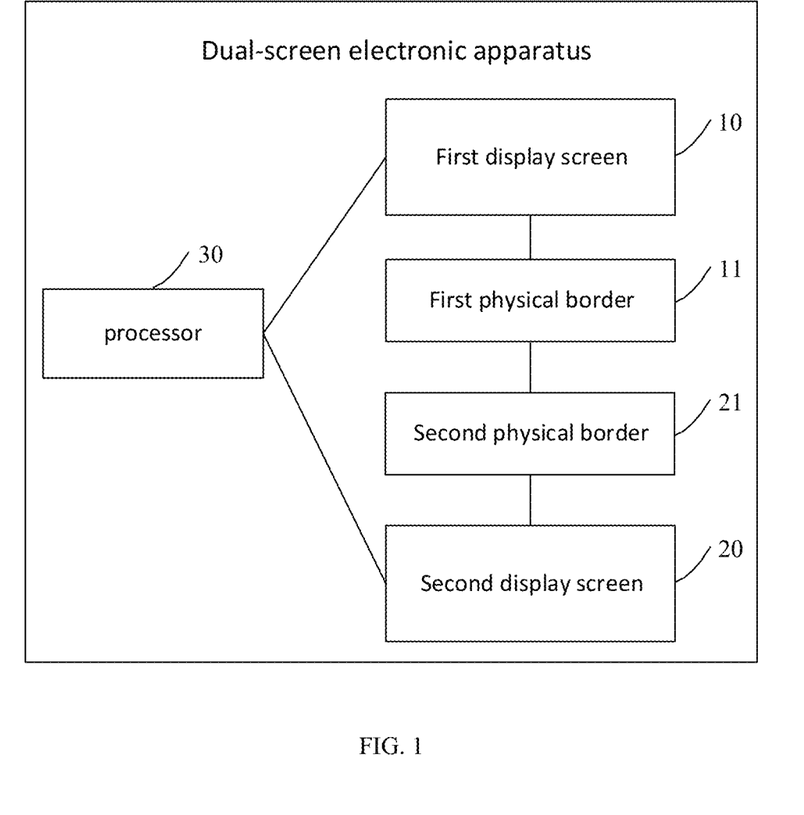
FIG. 1 is a schematic block diagram of a dual-screen electronic apparatus according to an embodiment of the present disclosure.

According to certain embodiments, the present disclosure provides a dual-screen electronic apparatus. FIG. 1 is a block diagram of a dual-screen electronic apparatus according to an embodiment. As shown in FIG. 1, the dual-screen electronic apparatus includes first display screen 10 configured to display first display information and a second display screen 20 configured to display second display information. A first physical border 11 is arranged at least on the first edge and the second edge of the first display screen for protecting the first display screen 10, wherein the first edge is opposite to the second edge. A second physical border 21 is arranged at least on the first edge and the second edge of the second display screen 20 for protecting the second display screen 20. The dual-screen electronic apparatus also includes a processor 30, configured to control the display of the first display screen 10 and the second display screen 20 according to a specified mode of use.

When the mode of use is a first mode of use, the first physical border 11 and the second physical border 21 arranged at adjacent edges of the first display screen 10 and the second display screen 20 are not exposed, giving the visual appearance of a borderless connection of the first display screen 10 and the second display screen 20. When the mode of use is a second mode of use, the first display screen 10 is arranged and exposed on a first surface of the dual-screen electronic apparatus, and the second display screen 20 is arranged and exposed on a second surface of the dual-screen electronic apparatus, the first surface being opposite to the second surface.

In certain embodiments, the first display information and the second display information may be display information for different parts of a same display object. For example, a portrait may be displayed by the first display screen and the second display screen. The first display screen may be configured to display the upper portion of the portrait, and the second display screen may be configured to display the lower portion of the portrait.

In certain embodiments, the first display information and the second display information may also be display information for the same portion of the same object. For example, a portrait may be displayed by both the first display screen and the second display screen displaying the full-body image in the portrait.

The first display information displayed by first display screen and the second display information displayed by the second display screen are both determined by the processor 30.

In certain embodiments, the dual-screen electronic apparatus may further include a housing 40 (not shown in FIG. 1), wherein the housing the first display screen 10, the first physical border 11, the second display screen 20, the second physical border 21, and the processor 30 are configured on or in the housing. Thus, by integrating the various components of the dual-screen electronic apparatus using the housing 40, the dual-screen electronic apparatus may be presented as an integrated unit.

In certain embodiments, when the mode of use is the first mode of use, the housing is not exposed where the first display screen 10 and the second display screen 20 are adjacent to each other, giving a visual appearance of a borderless connection between the first display screen 10 and the second display screen 20.

In certain embodiments, the second mode of use may be when the first display screen 10 and the second display screen 20 are in different horizontal planes, and a vertical projection of the first display screen 10 coincides with the second display screen 20.

Figure 2:
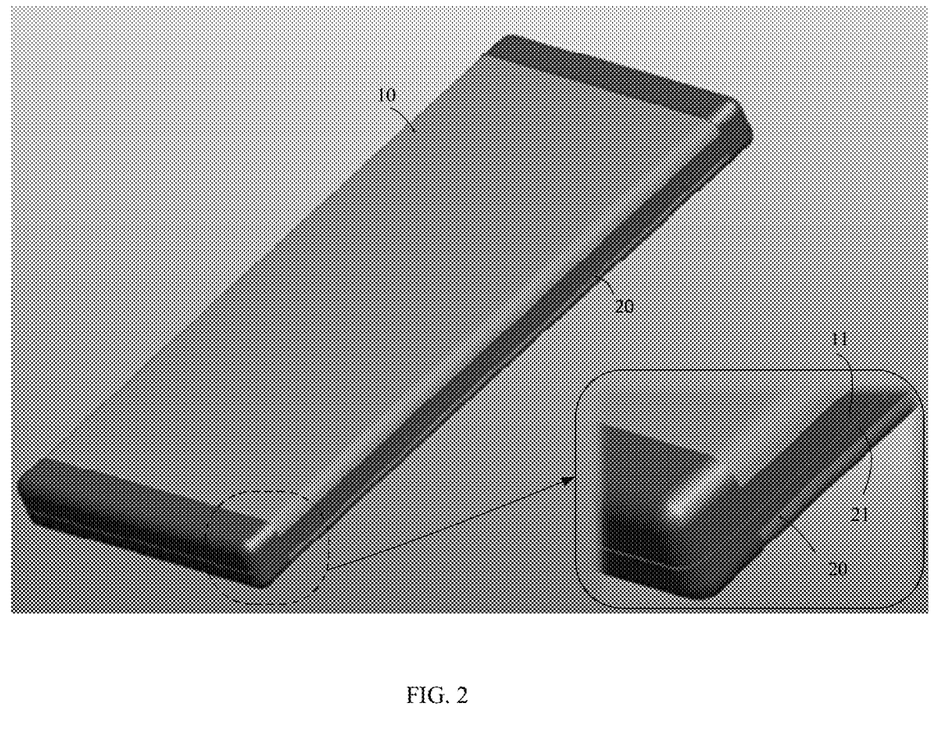
FIG. 2 is a perspective view of a dual-screen electronic apparatus configured in a second mode of use according to an embodiment of the present disclosure.

FIG. 2 is a perspective view of a dual-screen electronic apparatus configured in the second mode of use according to certain embodiments. As shown in FIG. 2, the first display screen 10 and the second display screen 20 are placed in different horizontal planes, and a vertical projection of the first display screen 10 coincides with the second display screen 20.

Figure 3:
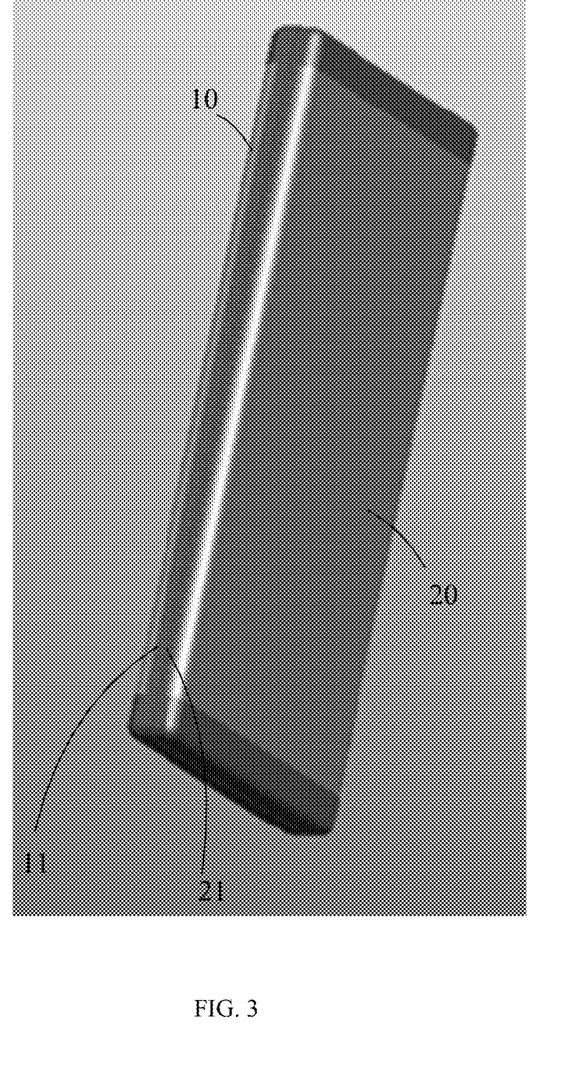
FIG. 3 is another perspective view of the dual-screen electronic apparatus configured in the second mode of use according to an embodiment of the present disclosure.

FIG. 3 is another perspective view of the dual-screen electronic apparatus configured in the second mode of use according to an embodiment of the present disclosure. As shown in FIG. 3, the first display screen 10 and the second display screen 20 are in different horizontal planes, and the vertical projection of the first display screen 10 coincides with the second display screen 20.

Figure 4:
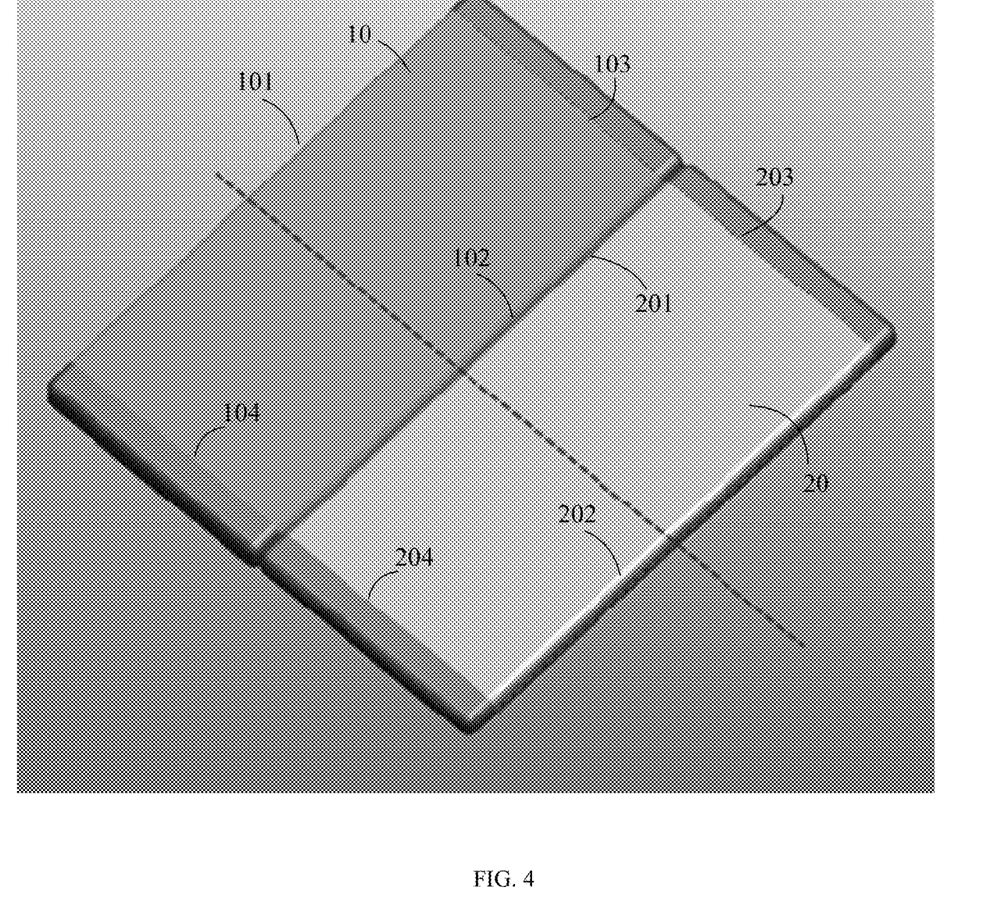
FIG. 4 is a perspective view of a dual-screen electronic apparatus configured in a first mode of use according to an embodiment of the present disclosure.

In certain embodiments, the first mode of use may be when the first display screen 10 and the second display screen 20 are in a same horizontal plane. FIG. 4 is a perspective view of the dual-screen electronic apparatus configured in the first mode of use according to an embodiment. The first display screen 10 has a first edge 101, a second edge 102, a third edge 103, and a fourth edge 104. The third edge 103 and the fourth edge 104 are opposite edges; the third edge 103 is adjacent to the first edge 101 and the second edge 102; and the fourth edge 104 is adjacent to the first edge 101 and the second edge 102. Similarly, the second display screen 20 has a first edge 201, a second edge 202, a third edge 203, and a fourth edge 204.

As shown in FIG. 4, the housing is not exposed between the second edge of the first display screen and the first edge of the second display screen, giving a visual appearance of a borderless connection between the first display screen 10 and the second display screen 20.

In certain preferable embodiments, the first mode of use may also be when the angle formed by the first display screen 10 and the second display screen 20 is greater than or equal to a first predetermined angle value a, and is smaller or equal to a second predetermined angle value b, where a is less than or equal to b.

For example, when the angle formed by the first display screen 10 and the second display screen 20 is greater than or equal to 90 degrees and less than 180 degrees, the housing is not exposed where the first display screen 10 and the second display screen 20 are adjacent to each other, giving a visual appearance of a borderless connection between the first display screen 10 and the second display screen 20.

Thus, in certain embodiments, the first mode of use is not limited to the configuration where the first display screen and the second display screen are in a same horizontal plane. As long as the angle between the first screen and second screen is within a predetermined angular range, the housing is not exposed where the first display screen 10 and the second display screen 20 are adjacent to each other, giving a broader range of arrangement with visually borderless connection between the first display screen 10 and the second display screen 20.

In certain embodiments, the first physical border and the second physical border may be bent with a predetermined curvature. The curvature of the physical borders may be designed so that when the angle formed by the first display screen and the second display screen is greater than or equal to the predetermined angle, the first physical border and the second physical border arranged at adjacent edges of the first display screen and the second display screen (for example, the second edge of the first display screen and the first edge of the second display screen) are not exposed, giving a visual appearance of a borderless connection of the first display screen and the second display screen.

In certain embodiments, depending on the curvature design of the physical borders, when the angle formed by the first display screen and the second display screen is greater than or equal to a predetermined angle, the first physical border and the second physical border arranged at adjacent edges of the first display screen and the second display screen may or may not be exposed.

In certain embodiments, the display screens are arranged with physical borders which do not display any display content. Thus, the physical borders may be hidden by using a curvature design. If each display screen is arranged on the housing, the housing may be hidden by using a curvature design as well. As shown in FIG. 2, the first physical border is not exposed on the first surface, the second physical border is not exposed on the second surface, the first portion of housing for protecting the first display screen is not exposed on the first surface, and the second portion of the housing for protecting the second display screen is not exposed on the second surface. Thus, when the dual-screen electronic apparatus is in the second mode of use, the first surface and the second surface are covered by the display screens and close to be borderless, giving a more compact and pleasing appearance to the dual-screen electronic apparatus.

In certain embodiments, based on a specific curvature design, when the angle formed by the first display screen and the second display screen is 0, the first display screen is arranged and exposed on the first surface of the dual-screen electronic apparatus, and the second display screen is arranged and exposed on the second surface of the dual-screen electronic apparatus, wherein the first physical border is not exposed on the first surface, and the second physical border is not exposed on the second surface, the first surface being opposite to the second surface. Further, in certain embodiments, the housing may not be exposed on the first surface or the second surface.

In certain embodiments, if the first physical border 11 is further arranged on the third edge 103 and the fourth edge 104 of the first display screen 10, the second physical border 21 is further arranged on the third edge 103 and the fourth edge 104 of the second display 20.

A first rotating shaft may be installed between the first physical border 11 arranged on the third edge of the first display screen and the second physical border 21 arranged on the third edge of the second display screen. A second rotating shaft 40 may be installed between the fourth edge of the first physical border 11 and fourth edge of the second physical border. Alternatively, the first rotating shaft may be installed between the housing outside the third edge of the first physical border 11 and the housing outside the third edge of the second physical border 21; and the second rotating shaft 50 may be installed between the housing outside the fourth edge of the first physical border 11 and the housing outside the fourth edge of the second physical border 21.

In certain embodiments, the processor 30 may further be configured to set the dual-screen electronic apparatus in the first mode of use or the second mode of use by controlling the rotation of the first rotating shaft 40 and the second rotating shaft 50.

The first mode of use may be understood as when the first display screen 10 and the second display screen 20 are in a same horizontal plane; and the second mode of use may be understood as the first display screen 10 and the second display screen 20 are in different horizontal planes, and the vertical projection of the first display screen 10 coincides with the second display screen 20.

Figure 5:
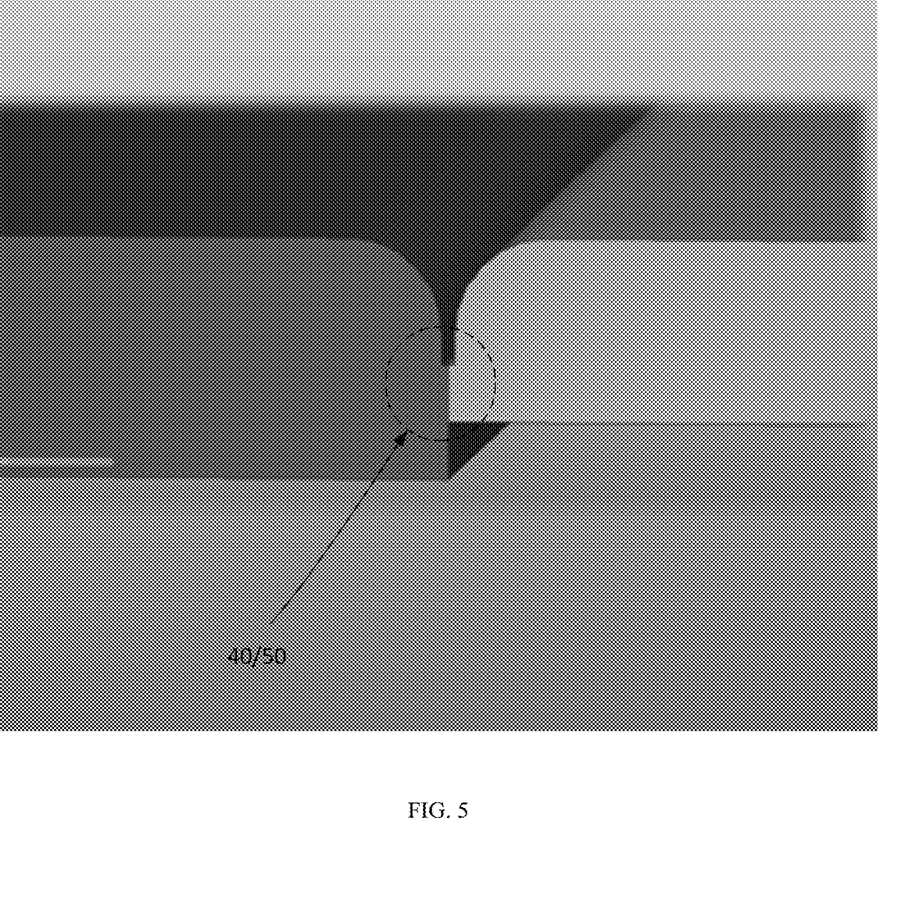
FIG. 5 is a cross-sectional view showing a first display screen and a second display screen connected by a rotating shaft according to an embodiment of the present disclosure.

FIG. 5 is a cross-sectional view showing the first display screen and the second display screen connected by rotating shafts 40 and 50. The first rotating shaft and the second rotating shaft may be installed on the first physical border and the second physical border, or are installed on the housing. The first rotating shaft and the second rotating shaft are not installed on the first display screen or the second display screen, instead, the first rotating shaft and the second rotating shaft are installed in the upper and lower boarders of the screens. That is, the first rotating shaft and second rotating shaft are installed at the two ends, so that the rotating shafts may be hidden. Compared to a configuration where a rotating shaft is installed in the middle of the two screens, when the two screens are in a same horizontal plane, a large gap may be present between the two screens, preventing a seamless connection between the two screens. With the foregoing arrangement of the rotating shafts in the present disclosure, when the dual-screen electronic apparatus is in the first mode of use, the first physical border and the second physical border are not exposed where the first display screen and the second display screen are adjacent, giving a visual appearance of a borderless connection between the first display screen and the second display screen.

In certain embodiments, optionally, if the first physical border 11 is not arranged on the third edge and the fourth edge of the first display screen 10, and the second physical border 21 is not arranged on the third edge and the fourth edge of the second display, then the first rotating shaft 40 may be arranged between the portion of housing outside the third edge of the first physical border 11 and the portion of housing outside the third edge of the second physical border 21; and the second rotating shaft 50 may be arranged between the portion of the housing outside the fourth edge of the first physical border 11 and the portion of the housing outside the fourth edge of the second physical border 21.

In certain embodiments, the processor 30 may be further configured to set the dual-screen electronic apparatus in the first mode of use or the second mode of use by controlling the rotation of the first rotating shaft 40 and the second rotating shaft 50.

In certain embodiments, the first mode of use may refer to when the first display screen 10 and the second display screen 20 are in a same horizontal plane; and the second mode of use may refer to when the first display screen 10 and the second display screens 20 are in different horizontal planes, and the vertical projection of the first display screen 10 coincides with the second display screen 20.

In certain embodiments, the processor 30 may further be configured to set the angle formed by the first display screen 10 and the second display screen 20 to a predetermined angle by controlling the rotation movement of first rotating shaft 40 and the second rotating shaft 50 when a first operation is detected. The first operation indicates that the dual-screen electronic apparatus is to be set in the first mode of use. When a second operation is detected, the processor 30 may be configured to set the angle formed by the first display screen 10 and the second display screen 20 to 0 degree by controlling the movements of the first rotating shaft 40 and the second rotating shaft 50. The second operation indicates that the dual-screen electronic apparatus is to be set in the second mode of use.

In certain embodiments, optionally, the processor 30 may be further configured to: determine a first display area on the first display screen 10 and a second display area on the second display screen 20 when the mode of use is the first mode of use; process the first display information to be outputted by the first display area to display a first target object with visual consistency between the first display area and the other portions of the first display screen; and process the second display information to be outputted by the second display area to display a second target object with visual consistency between the second display area and the other portions of the second display screen.

In certain embodiments, the first display area may be a curved area of the first display screen near one or more edges of the first display screen. The other portions of the first display screen may be a flat portion. Similarly, the second display area may be a curved area on the second display screen near one or more edges of the second display screen. The other portions of the first display screen may be a flat portion.

Figure 6:
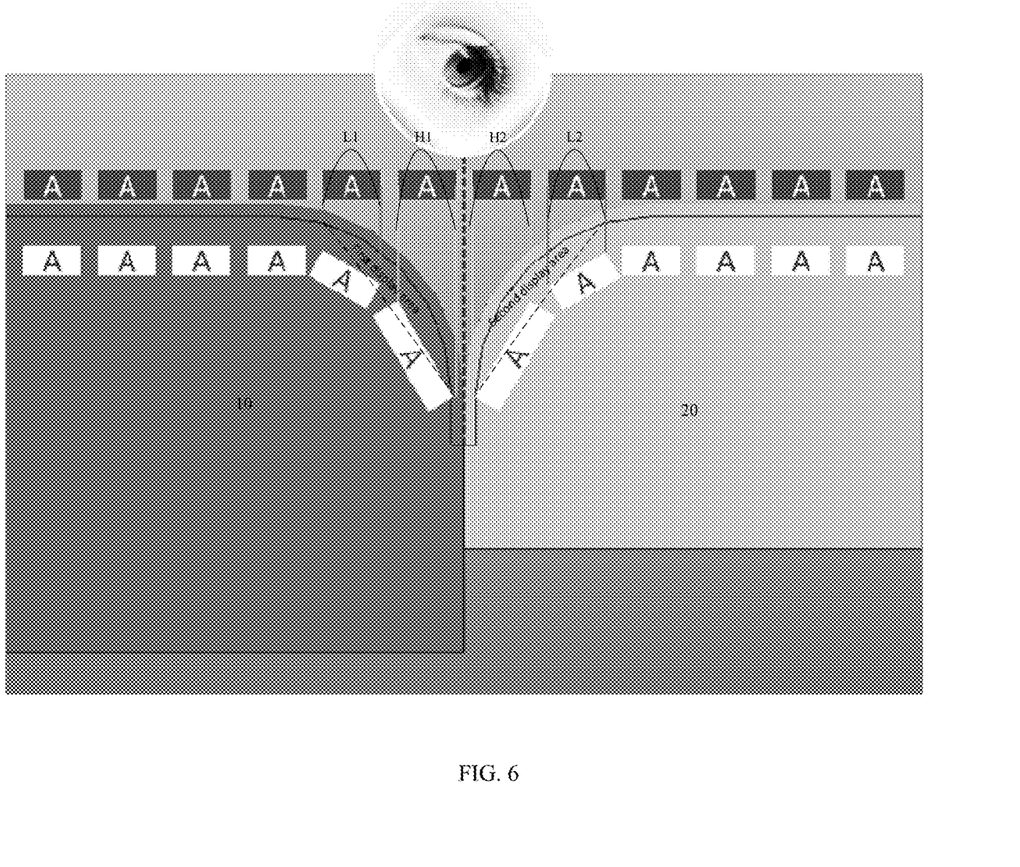
FIG. 6 is a diagram illustrating image display by the first display screen and the second display screen when the dual-screen electronic apparatus is in the first mode of use according to an embodiment of the present disclosure.

FIG. 6 is a schematic diagram showing image display of the first display screen and the second display screen when the mode of use is the first mode of use. As shown in FIG. 6, the dark blocks A's represent the image a user visualizes. The white blocks A's represent the image outputted by the display screens. For the convenience of description, assume that N pixels display an image on a flat region, i.e., a non-curved region; then, in a curved display area, an image of the same size needs to be displayed by more than N pixels. That is to say, in the edge and corner regions of the two display screens where the screens are curved, the image displayed by the screens needs to be elongated or enlarged so that the visualized image at the edge and corner regions is consistent with the image displayed in the flat region, and thus is not distorted.

As shown in FIG. 6, on the first display screen 10, a distance between a pair of vertical lines is L1, and a distance between another pair of vertical lines is H1. In order for the user to visualize the two dark blocks corresponding to L1 and H1 as the same size as the dark blocks on the flat area of the first display screen, the white blocks corresponding to L1 and H1 need to be preprocessed. For example, they need to be appropriately enlarged.

Similarly, on the second display screen 20, a distance between a pair of vertical lines is L2, and a distance between another pair of vertical lines is H2. In order for the user to visualize the two dark blocks corresponding to L2 and H2 as the same size as dark the blocks on the flat area of the second display screen, the white blocks corresponding to L2 and H2 need to be preprocessed. For example, they need to be appropriately enlarged.

Thus, after the preprocessing the white blocks corresponding to L1, H1, L2, and H2 with respective magnification ratio, according to the user's visualization, the dark blocks A's on the flat or curved areas of the display screens may appear to be of the same size. The forgoing design and display method not only increase the display area, but also eliminate distortion of image displayed on the display screens.

In certain embodiments, the first target object and the second target object may form a to-be-displayed object. The processor 30 may be further configured to control the display of the first target object on the first display screen 10, so that the displayed image of the first target object is consistent with the display of the second target object displayed on the second display screen 20 to form a continuously displayed image. Thus, the image display by the large screen formed by combining the first display screen and the second display screen is similar to the image displayed by a single large screen.

In certain embodiments, when the mode of use is the second mode of use, the processor 30 may be further configured to: determine whether a to-be-displayed object is to be displayed by the first display screen or the second display screen; and display the to-be-displayed object to a corresponding display screen according to the determined result, so that the to-be-displayed object is displayed by the corresponding display screen. Thus, the dual-screen electronic apparatus may be used to display information like a normal single-screen electronic apparatus.

Thus, the dual-screen electronic apparatus may be based on two rigid curved display screens. Visually borderless effect may be achieved by utilizing the optical display properties of the curved display screens. The two rigid display screens may be combined into a compact and expandable display system to meet the user's demand for dual-screen displays.

Figure 7:
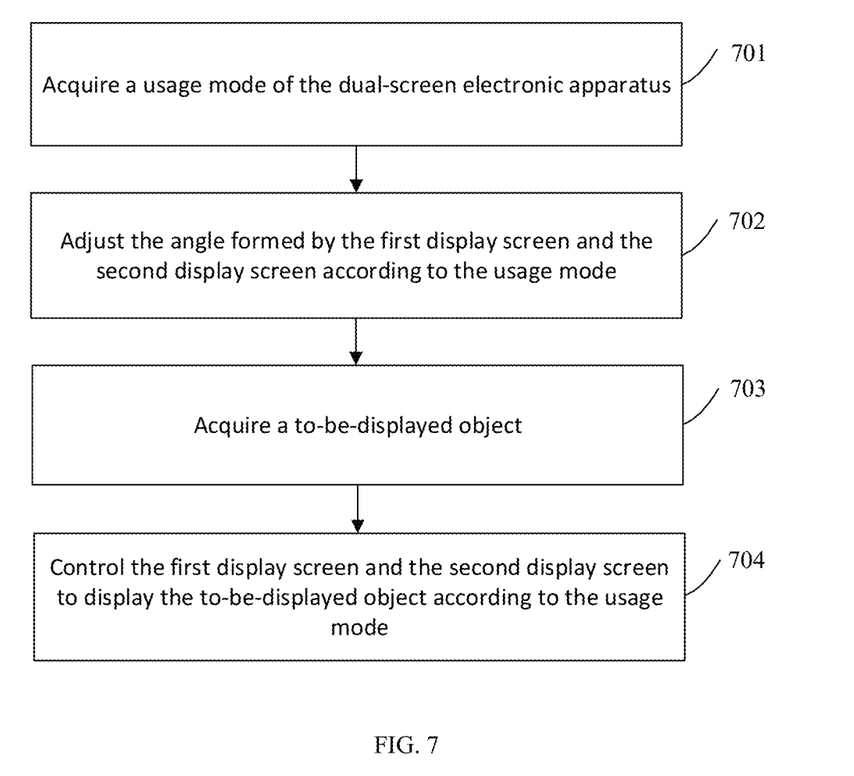
FIG. 7 is a schematic flowchart of a display control method according to an embodiment of the present disclosure.

The present disclosure further provides a display control method based on the dual-screen electronic apparatus in the forgoing description. As shown in FIG. 7, the method includes the following steps.

Step 701: Acquire a mode of use of the dual-screen electronic apparatus.

The mode of use may include a first mode of use and a second mode of use. When the mode of use is the first mode of use, the first physical border and the second physical border are not exposed where the first display screen and the second display screen are adjacent, giving a visual appearance of a borderless connection between the first display screen and the second display screen are adjacent to each other.

In certain embodiments, acquiring the mode of use of the dual-screen electronic apparatus may include: receiving a trigger operation; and determining the mode of use of the dual-screen electronic apparatus according to the triggering operation.

The triggering operation may be a voice triggering operation or a manual triggering operation. For example, when the dual-screen electronic apparatus receives a triggering operation from the user by operating on a touch-screen interface having mode of use selection options, the mode of use of the dual-screen electronic apparatus may be determined according to the user's touch-screen operation.

Step 702: Adjust the angle formed by the first display screen and the second display screen according to the mode of use.

In certain embodiments, adjusting the angle formed by the first display screen and the second display screen according to the mode of use may include: when the mode of use is the first mode of use, setting the angle formed by the first display screen and the second display screen to be greater than or equal to a predetermined angle; and when the mode of use is the second mode of use, setting the angle formed by the first display screen and the second display screen to be 0.

In certain embodiments, adjusting the angle formed by the first display screen and the second display screen may be achieved by controlling the rotation of the first rotating shaft and the second rotating shaft.

In the first mode of use, if the angle formed by the first display screen and the second display screen may be 180 degrees, so that the first display screen and the second display screen are in a same horizontal plane. In the second mode of use, the first display screen and the second display screens are in different horizontal planes, and the vertical projection of the first display screen coincides with the second display screen. Thus, the dual-screen electronic apparatus may automatically adjust the angle formed by the first display screen and the second display screen according to the mode of use.

By performing the foregoing steps 701 and 702, the angle formed by the first display screen and the second display screen may be automatically adjusted according to the user's instruction, so that the dual-screen electronic apparatus is configured to the user's desired mode of use.

Further, the user may also set the electronic apparatus in a certain mode of use by using a manual operation on the dual-screen electronic apparatus, that is, manually adjusting the angle formed by the first display screen and the second display screen, so that the dual-screen electronic apparatus may be used in a more flexible manner.

Step 703: Acquire a to-be-displayed object.

The to-be-displayed objected is determined by the processor in the dual-screen electronic apparatus.

Step 704: Control the first display screen and the second display screen to display the to-be-displayed object according to the mode of use.

In certain embodiments, controlling the first display screen and the second display screen to display the to-be-displayed object according to the mode of use may include: determining a first display area of the first display screen and a second display area of the second display screen when the mode of use is the first mode of use; processing the first display information of the first display area, so that the first target object can be displayed with visual consistency between the first display area and the other portions of the first display screen; and processing the second display information of the second display area, so that the second target object can be displayed with visual consistency between the second display area and the other portions of the second display screen. The to-be-displayed object includes the first target object and the second target object.

In certain embodiments, controlling the first display screen and the second display screen to display the to-be-displayed object according to the mode of use may further include: when the mode of use is the first mode of use, controlling the display of the first target object on the first display screen, so that the displayed image is consistent with the display of the second target object displayed on the second display screen to form a continuously displayed image.

In certain embodiments, controlling the first display screen and the second display screen to display the to-be-displayed object according to the mode of use may include: when the mode of use is the second mode of use, determining whether the to-be-displayed object is to be displayed by the first display screen or the second display screen; and displaying the to-be-displayed object to a corresponding display screen according to the determined result, so that the to-be-displayed object is displayed by the corresponding display screen. Thus, the dual-screen electronic apparatus may be used to display information like a normal single-screen electronic apparatus.

The display control method according to the embodiments of the present disclosure is based on a parallel design of two rigid curved display screens. When the mode of use is the first mode of use, the first physical border and the second physical border are not exposed where the first display screen and the second display screen are adjacent, giving a visual appearance of a borderless connection between the first display screen and the second display screen are adjacent to each other by utilizing the optical display properties of the display screens. Thus, the dual-screen electronic apparatus may use two rigid display screens to achieve the effect of flexible screens, reducing the cost of the electronic apparatus. When the two display screens are on the same plane, the combined display screen not only increases effective display area but also producing displays without distortion. When the two display screens are in the second mode of use, a single-screen display apparatus can be presented, thereby making the electronic apparatus more compact in size and more convenient for storage.

In the several embodiments provided by the present disclosure, it should be understood that the disclosed system, apparatus, and method may be implemented in other manners. For example, the apparatus embodiments described above are merely illustrative. For example, the division of the units is only a logical function division. In actual implementation, there may be another division manner, for example, multiple units or components may be combined or integrated into another system. Some features can be omitted or not executed. In addition, the coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units. That is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution of the present disclosure, in essence or as the contribution to the prior art, or all or part of the technical solution may be embodied in the form of a software product stored in a storage medium. A number of instructions are included to cause a computer device (which may be a personal computer, server, or network device, etc.) to perform all or part of the steps of the methods described in various embodiments of the present disclosure. The storage medium includes: U disk, removable hard disk, a read-only memory (ROM, Read-Only Memory), a random-access various memory (RAM, Random Access Memory), a magnetic disk, or an optical medium that can store program codes.

The above embodiments are only used to explain the technical solutions of the present disclosure, and are not limited thereto. Although the present disclosure has been described in detail with reference to the foregoing embodiments, those skilled in the art should understand that they can modify the technical solutions described in the embodiments, or substitute the technical features of the embodiments with equivalents. The modifications and substitutions of the embodiments do not depart from the spirit and scope of the technical solutions of the embodiments of the present disclosure.

What is claimed is:

1. A dual-screen electronic apparatus, comprising:
a first display screen with a first physical border;
a second display screen with a second physical border; and
a processor, configured to:
in response to a first operation, set the dual-screen electronic apparatus to operate in a first mode of use by setting an angle formed by the first display screen and the second display screen to a first angle;
in response to a second operation, set the dual-screen electronic apparatus to operate in a second mode of use by setting the angle formed by the first display screen and the second display screen to a second angle; and
control displays of the first display screen and the second display screen;
wherein:
when the dual-screen electronic apparatus operates in the first mode of use, a first portion of the second physical border and a second portion of the first physical border are placed hidden from view; and
when the dual-screen electronic apparatus operates in the second mode of use, the first display screen is arranged on a first surface of the dual-screen electronic apparatus, and the second display screen is arranged on a second surface of the dual-screen electronic apparatus, the first surface being opposite to the second surface.

2. The dual-screen electronic apparatus according to claim 1, further comprising: a housing integrating the first display screen, the first physical border, the second display screen, the second physical border, and the processor into one physical unit, wherein:

when the dual-screen electronic apparatus operates in the first mode of use, a first portion of the housing adjacent to the first physical border of the first display screen and a second portion of the housing adjacent to the second physical border the second display screen are placed hidden from view.

3. The dual-screen electronic apparatus according to claim 2, wherein:
the first physical border is bent with a first curvature;
the second physical border is bent with a second curvature;
in response to the angle formed by the first display screen and the second display screen being greater than or equal to a threshold angle, the first portion of the second physical border and the second portion of the first physical border are placed hidden from view.

4. The dual-screen electronic apparatus according to claim 3, wherein:
in response to the angle formed by the first display screen and the second display screen being greater than or equal to the threshold angle, the first portion and the second portion of the housing are placed hidden from view.

5. The dual-screen electronic apparatus according to claim 3, wherein:
in response to the angle formed by the first display screen and the second display screen being 0:
the first display screen is arranged on the first surface of the dual-screen electronic apparatus;
the second display screen is arranged on the second surface of the dual-screen electronic apparatus;
the first physical border is not exposed on the first surface; and
the second physical border is not exposed on the second surface.

6. The dual-screen electronic apparatus according to claim 2, further comprising:
a first rotating shaft installed between a third portion of the housing adjacent to the first display screen and a fourth portion of the housing adjacent to the second display screen;
a second rotating shaft installed between a fifth portion of the housing adjacent to the first display screen and a sixth portion of the housing adjacent to the second display screen;
wherein:
the processor is further configured to control the first rotating shaft and the second rotating shaft to set the dual-screen electronic apparatus in the first mode of use or the second mode of use.

7. The dual-screen electronic apparatus according to claim 6, wherein:
in response to the dual-screen electronic apparatus being in the first mode of use, the processor is configured to control the first rotating shaft and the second rotating shaft to set the angle formed by the first display screen and the second display screen to an angle equal to or greater than a threshold angle.

8. The dual-screen electronic apparatus according to claim 6, wherein:
in response to the dual-screen electronic apparatus being in the second mode of use, the processor is configured to control the first rotating shaft and the second rotating shaft to set the angle formed by the first display screen and the second display screen to 0.

9. The dual-screen electronic apparatus according claim 1 wherein:
the dual-screen electronic apparatus further comprises a first rotating shaft installed between a third portion of the first physical border and a third portion of the second physical border, and a second rotating shaft installed between a fourth portion of the first physical border and a fourth portion of the second physical border; and
the processor is further configured to control the first rotating shaft and the second rotating shaft to set the dual-screen electronic apparatus in the first mode of use or the second mode of use.

10. A dual-screen electronic apparatus, comprising:
a first display screen including a first curved display area and a first flat display area;
a second display screen including a second curved display area and a second flat display area; and
a processor, configured to:
process first display information for the first curved display area to display a first target object with visual consistency between the first curved display area and the first flat display area; and
process second display information for the second curved display area to display a second target object with visual consistency between the second curved display area and the second flat display area;
wherein:
for displaying a same image feature, the first curved display area or the second curved display area outputs the image feature with greater number of pixels compared to the first flat display area and the second flat display area.

11. The dual-screen electronic apparatus according to claim 10, wherein the processor is further configured to:
displaying, on the first display screen and the second display screen, the first target object and the second target object to form a continuous image.

12. The dual-screen electronic apparatus according to claim 10, wherein the first target object and the second target object are different parts of a same display object.

13. The dual-screen electronic apparatus according to claim 10, wherein the first target object and the second target object are the same part of a same display object.

14. A display control method for a dual-screen electronic apparatus having a first display screen and a second display screen, comprising:
obtaining a mode of use of the dual-screen electronic apparatus;
adjusting an angle formed by the first display screen and the second display screen according to the mode of use;
determining a first curved display area and a first flat display area of the first display screen;
determining a second curved display area and a second flat display area of the second display screen;
processing first display information for the first curved display area to display a first target object with visual consistency between the first curved display area and the first flat display area; and
processing second display information for the second curved display area to display a second target object with visual consistency between the second curved display area and the second flat display area;
wherein:
for displaying a same image feature, the first curved display area or the second curved display area outputs the image feature with greater number of pixels compared to the first flat display area and the second flat display area.

15. The display control method according to claim 14, further comprising:
- displaying, on the first display screen and the second display screen, the first target object and the second target object to form a continuous image.

16. The display control method according to claim 14, wherein the first target object and the second target object are different parts of a same display object.

17. The display control method according to claim 14, wherein the first target object and the second target object are a same part of a same display object.

18. The display control method according to claim 14, wherein adjusting the angle formed by the first display screen and the second display screen according to the mode of use comprises:
- rotating a first rotating shaft and a second rotating shaft installed between the first display screen and the second display screen.

19. The display control method according to claim 18, wherein adjusting the angle formed by the first display screen and the second display screen according to the mode of use further comprises:
- in response to a first mode of use, rotating the first rotating shaft and the second rotating shaft to set the angle formed by the first display screen and the second display screen to an angle greater than or equal to a threshold angle.

20. The display control method according to claim 18, wherein adjusting the angle formed by the first display screen and the second display screen according to the mode of use further comprises:
- in response to a second mode of use, rotating the first rotating shaft and the second rotating shaft to set the angle formed by the first display screen and the second display screen to 0.

* * * * *